United States Patent

Posner

[15] 3,642,246

[45] Feb. 15, 1972

[54] MOLD FOR MOLDING ARTICLES COMPOSED OF DIFFERENT MATERIALS

[72] Inventor: Richard Posner, East Northport, N.Y.

[73] Assignee: Creative Polymer Products Corp., Long Island City, N.Y.

[22] Filed: Mar. 12, 1970

[21] Appl. No.: 18,946

[52] U.S. Cl. .......................... 249/105, 18/30 US, 18/30 WJ, 18/42 D
[51] Int. Cl. ........................................ B29c 9/00, B29f 1/12
[58] Field of Search ............. 18/30 UC, 30 US, 42 D, 30 WJ; 249/107, 108, 110, 105

[56] References Cited

UNITED STATES PATENTS

| | | | |
|---|---|---|---|
| 2,499,565 | 3/1950 | Booth | 18/30 US UX |
| 3,305,895 | 2/1967 | Ludwig | 18/30 US X |
| 3,425,883 | 2/1969 | Smith | 18/42 D X |
| 2,485,323 | 10/1949 | Schwartz | 18/42 D X |
| 3,319,301 | 5/1967 | Ludwig | 18/30 US X |
| 2,226,408 | 12/1940 | Nast | 18/3 UC UX |
| 2,717,793 | 9/1955 | Nenzell | 18/42 D UX |
| 2,962,761 | 12/1960 | Hobson | 18/42 D UX |
| 2,799,435 | 7/1957 | Abplanap | 18/42 D X |
| 2,878,517 | 3/1959 | Cramer | 249/107 |
| 3,259,356 | 7/1966 | Hehl | 18/30 UC X |
| 3,319,300 | 5/1967 | Hehl | 18/30 UC X |

FOREIGN PATENTS OR APPLICATIONS

| | | | |
|---|---|---|---|
| 759,666 | 10/1956 | Great Britain | 18/42 D |
| 6,709,817 | 1/1968 | Netherlands | 18/42 D |
| 650,270 | 12/1962 | Italy | 18/30 UC |

OTHER PUBLICATIONS

Modern Plastics Encyclopedia article; September 1965; pp. 725, 726

Injection-Mould Design Fundamentals article; pp. 98; The Industrial Press N.Y., N.Y.

*Primary Examiner*—J. Howard Flint, Jr.
*Attorney*—Hane, Baxley & Spiecens

[57] ABSTRACT

A mold has at least one mold cavity and two mutually isolated sprues. Each sprue is connected via a different runner or gate to the mold cavity. A different material is fed to the mold cavity via each sprue.

5 Claims, 5 Drawing Figures

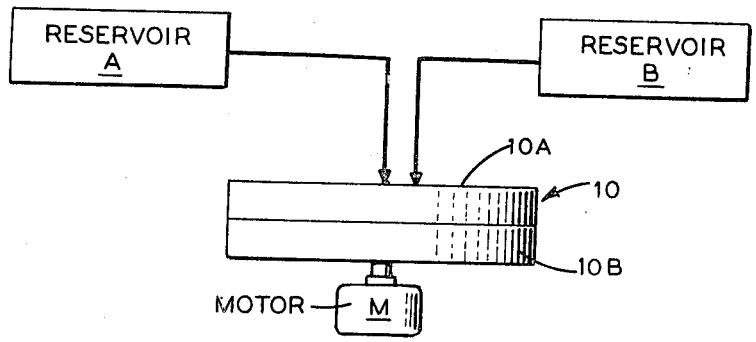
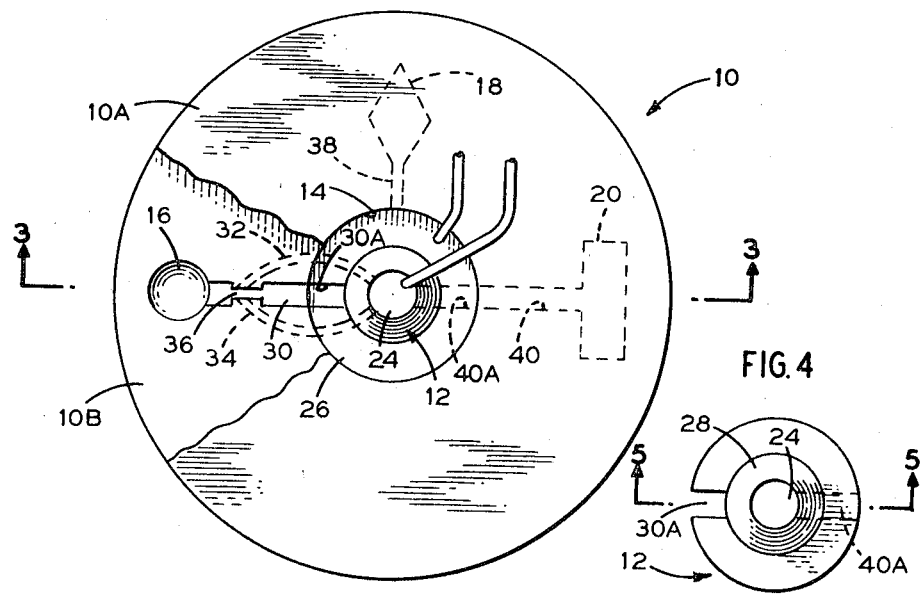
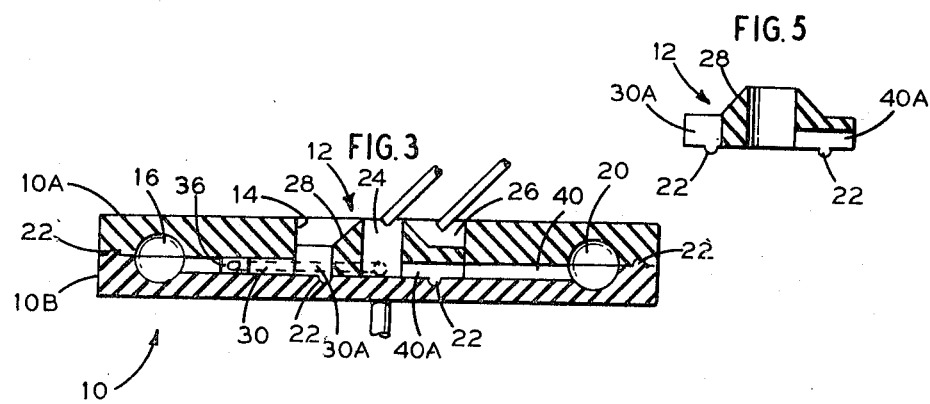
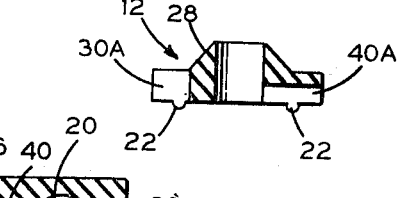
INVENTOR.
Richard Posner
BY Hane, Baxley & Spiecens
ATTORNEY

MOLD FOR MOLDING ARTICLES COMPOSED OF DIFFERENT MATERIALS

This invention pertains to molds and, more particularly, to molds for molding articles from a settable fluid composed of at least two different materials.

Quite often in molding articles such as costume jewelry stones, giftware and household decorations, marbelized effects are desired. In such cases, it is necessary to combine two different colored resins or the like in a partially mixed state in a mold cavity. Heretofore, when this was attempted very undesirable marbelized effects were obtained because of the difficulty controlling the combination. In other cases, it may be necessary to use very rapidly setting resins. However, the nature of the mold may be such that the time between the mixing of the resin and the catalyst and the entry of the resin and catalyst into the mold cavity is long enough to cause setting of the mixture in the runner or gate before the cavity is filled.

In either case, it highly desirable to mix the two materials only at their entry into the mold cavity.

It is, accordingly, a general object of the invention to provide an improved mold for molding articles from a settable fluid composed of at least two different materials.

It is another object of the invention to provide such a mold wherein the two different materials are only mixed at their point of entry into the mold cavity.

Briefly, the invention contemplates a mold for molding articles from a settable fluid composed of at least two different materials. The mold comprises at least two mold sections in abutting relationship. The mold sections have at least one mold cavity defining the form of the article to be molded.

In at least one of the mold sections there are two mutually isolated sprues. Each sprue receives a different one of the materials. A different runner connects each sprue to the mold cavity so that the materials received by each of the sprues only combine as they enter the cavity.

A feature of the invention is to make such a mold rotatable with central sprues so that centrifugal force may be utilized in filling the mold cavity with a bubble-free material.

A further feature of the invention is to include other mold cavities fed from only one of the sprues so that solid color as well as marbelized articles can be simultaneously molded.

Other objects, features and advantages of the invention will be apparent from the following detailed description when read with the accompanying drawing which shows the presently contemplated preferred embodiment of the invention.

In the drawing:

FIG. 1 is a schematic diagram of a mold being fed with two different materials in accordance with the invention;

FIG. 2 shows a top view of the mold of FIG. 1 with a portion of the top mold section broken away;

FIG. 3 is a cross-sectional view taken along the line 3—3 of FIG. 2;

FIG. 4 is a top view of the central inset defining the sprues of the mold of FIG. 2; and FIG. 5 is a cross-sectional view taken along the line 5—5 of FIG. 4.

In FIG. 1, a mold 10 comprising mold sections 10A and 10B is rotatably driven by motor M while being simultaneously fed different-colored settable resins from reservoirs A and B. As will hereinafter become apparent, the mold will simultaneously produce articles bearing the color of the resin in reservoir A, articles bearing the color of the resin in reservoir B and articles that are marbelized with the two colors.

The actual construction of mold 10 is shown in FIGS. 2 to 5. The mold 10 includes top mold section 10A, bottom mold section 10B and sprue-defining inset 12 along the axis of rotation of the mold 10. Top mold section 10A is annular with a central opening 14 through which insert 12 is placed to rest on bottom mold section 10B. Alignment bosses and mating recesses are provided to line up the sections and insert. Within the mold sections 10A and 10B and radially displaced from the axis of rotation are mold cavities 16, 18 and 20.

Within the center of insert 12 is a central sprue 24. Annularly disposed about central sprue 24 and concentric therewith is a second sprue 26. Sprue 26 is defined by the periphery of central opening 14 and the outer wall 28 of insert 12. As can be seen, reservoir A feeds central sprue 24 and reservoir B feeds second sprue 26.

Cut in mold section 10B is a runner or gate 30 which connects second sprue 26 to cavity 16, as well as runners 32 and 34 which connect central sprue 24 to cavity 16. Runners 30, 32 and 34 meet at region 36 adjacent the mold cavity 16. Runner 30 continues as runner 30A in insert 12. Thus, when reservoirs A and B simultaneously deliver their different colored resins, marbelized mixing takes place at region 36 and a marbelized mixture is fed into mold cavity 16.

In addition, only a single runner 38 in mold section 10B connects sprue 26 to mold section 18. Therefore, the article molded in cavity 18 will be the color of the material from reservoir B. Finally, a single runner 40 connects central sprue 24 to mold cavity 20 via runner 40A in insert 12. Therefore, the article molded in cavity 20 will have the color of the resin from reservoir A.

There has thus been shown mold for molding marbelized articles as well as solid-colored articles at the same time. While the example given shows the use of different-colored resins, it should be realized that with respect to mold cavity 16 (assuming cavities 18 and 20 are not present) the fluid from the reservoirs could be a resin and a catalyst with the mixing occurring at the inlet to the cavity.

While only one embodiment of the invention has been shown and described in detail, there will now be obvious to those skilled in the art, many modifications and variations satisfying many or all of the objects of the invention without departing from the spirit thereof as defined by the appended claims.

What is claimed is:

1. A mold for molding articles from a settable fluid composed of at least two different materials comprising at least two mold sections in abutting relationship, said mold sections being provided with at least one mold cavity defining the form of the article to be molded, at least first and second mutually isolated sprues, in at least one of said mold sections, each of said sprues being adapted to receive a different one of the materials, a first gate in at least one of said mold sections conductively connecting said first sprue to a given entrance port of said mold cavity, and a second gate in at least one of said mold sections conductively connecting said second sprue to said given entrance port of said mold cavity thereby said different materials mix at the entrance of said mold cavity.

2. The mold of claim 1 wherein said mold sections are rotatable about a given axis of rotation, said mold cavity is radially displaced from said axis of rotation, said first sprue is aligned with said axis of rotation, and said second sprue is annular in shape and concentrically disposed about said first sprue.

3. The mold of claim 1 further comprising a second mold cavity in said mold sections and a third gate connecting one of said sprues to said second mold cavity.

4. A mold for molding articles from a settable fluid composed of at least two different materials comprising at least two mold sections in abutting relationship, said mold sections being rotatable about a given axis of rotation, said mold sections being provided with at least first and second mold cavities defining the forms of the articles to be molded, said mold cavities being radially displaced from said axis of rotation, at least first and second mutually isolated sprues, in at least one of said mold sections, each of said sprues being adapted to receive a different one of the materials, a first gate in at least one of said mold sections conductively connecting said first sprue to said first mold cavity, a second gate in at least one of said mold sections conductively connecting said second sprue to said first mold cavity, and a third gate connecting one of said sprues to said second mold cavity, said first sprue being aligned with said axis of rotation, and said second sprue being annular in shape and concentrically disposed about said first sprue.

5. The mold of claim 4 further comprising a third mold cavity in said mold sections and a fourth gate connecting the other of said sprues to said third mold cavity.

* * * * *